United States Patent [19]

Hall et al.

[11] 4,021,643

[45] May 3, 1977

[54] IMMERSION HEATER FOR AQUARIUMS

[75] Inventors: Frank Kenneth Hall; Ronald D. Moore, both of Saginaw, Mich.

[73] Assignee: O'Dell Manufacturing, Inc., Saginaw, Mich.

[22] Filed: June 13, 1974

[21] Appl. No.: 479,252

Related U.S. Application Data

[63] Continuation-in-part of Ser. No. 433,291, Jan. 14, 1974, Pat. No. 3,895,217.

[52] U.S. Cl. ............................... 219/523; 119/5; 219/326; 219/331; 219/335; 219/513; 337/120; 337/315

[51] Int. Cl.² ............... H05B 3/80; H05B 1/02; H01H 37/44; A01K 64/02

[58] Field of Search ......... 219/210, 322, 331, 332, 219/431, 437, 440, 441, 513, 523, 527, 528, 530, 536, 544, 540, 326, 315, 316, 318, 319, 333, 335–338, 511, 496; 337/114, 117, 120, 312, 317, 320, 314, 315; 200/83 N, 83 R; 119/5; 338/231

[56] References Cited

UNITED STATES PATENTS

| | | | |
|---|---|---|---|
| 1,178,777 | 4/1916 | Apfel | 219/326 |
| 1,690,986 | 11/1928 | Macy | 219/326 X |
| 1,691,749 | 11/1928 | Williams et al. | 219/513 X |
| 1,718,865 | 6/1929 | Macy | 219/326 |
| 1,718,866 | 6/1929 | Macy | 219/326 X |
| 1,820,842 | 8/1931 | Sparks | 219/536 |
| 2,524,886 | 10/1950 | Colander et al. | 219/210 |
| 2,666,838 | 1/1954 | Krah et al. | 219/523 |
| 2,697,766 | 12/1954 | Goldmuntz | 200/83 N X |
| 2,699,488 | 1/1955 | Arak et al. | 219/332 X |
| 2,780,703 | 2/1957 | MacIntyre | 338/231 X |
| 2,811,629 | 10/1957 | Danner | 219/523 |
| 2,888,547 | 5/1959 | Saper | 219/331 X |
| 2,987,602 | 6/1961 | Hodges | 219/513 X |
| 3,073,940 | 1/1963 | Brandl | 219/513 |
| 3,107,290 | 10/1963 | Willinger | 219/523 X |
| 3,166,893 | 1/1965 | Sherwood | 337/120 |
| 3,250,521 | 5/1966 | Sergent | 219/430 |
| 3,444,356 | 5/1969 | Finn | 219/513 X |
| 3,511,970 | 5/1970 | Kjellberg | 219/331 |
| 3,536,893 | 10/1970 | Cranley | 219/523 |
| 3,564,589 | 10/1969 | Arak | 219/523 X |
| 3,619,565 | 11/1971 | D'Elia et al. | 219/523 |
| 3,731,058 | 5/1973 | Bleiweiss | 219/523 |
| 3,764,780 | 10/1973 | Ellis | 219/430 |
| 3,833,792 | 9/1974 | Kodaira | 219/530 X |
| 3,895,217 | 7/1975 | Hall et al. | 219/332 X |

*Primary Examiner*—A. Bartis
*Attorney, Agent, or Firm*—Learman & McCulloch

[57] ABSTRACT

A thermostatically controlled safety heater for upright immersion in an aquarium includes a housing with an axially extending, heat-transmitting tube forming a chamber in which an electric heating element is disposed in radially spaced relation from the tube. The radial space between the tube and element, over substantially the axial length of the element, is with a heat conducting, thermally expansible liquid. An actuator device including a linearly movable plunger reactive to thermal expansion of the liquid is provided for opening and closing a switch in circuit with the heating element for maintaining the heater at a desired temperature. A hunting tendency of the switch contacts is overcome by providing a damping medium in the form of an air space having a volume less than about ten per cent of the volume of liquid between the plunger and the liquid. An expansible sealing diaphragm supports the plunger and isolates the liquid to the portion of the tube in which the heating element is disposed.

23 Claims, 5 Drawing Figures

IMMERSION HEATER FOR AQUARIUMS

The present application is a continuation-in-part of our prior filed application U.S. Ser. No. 433,291, filed Jan. 14, 1974, now U.S. Pat. No. 3,895,217.

BACKGROUND OF THE INVENTION

Many patents have been granted on thermostatically controlled aquarium heaters of the type which are normally immersed in aquarium tanks for raising the temperature of aquaria to levels suitable for the maintenance and propagation of fish and other living bodies therein, and to maintain them at such levels. Prior heating devices have been responsive to changes in the temperature of the aquarium water and included bimetallic strips, interposed in the heater element circuit and carried in the heater housing atmosphere, which are deflected in accordance with changes in temperatures to make and break associated electrical contact members. Certain difficulties have been encountered in conjunction with the use of heaters of this character and one of the problems has been that the thermostatic control was basically responsive only to the temperature of the water in the tank. If such a heater was removed by the hobbyist, while connected to a power source, as sometimes happens, and placed on a relatively colder surface, for example, (so that the device continued to demand heat) the heater could easily overheat and explode. Further, there is the danger of fire and electrical shock in such situations. Moreover, localized hot spots seem inevitably to occur in varied locations on present day heater tube walls with the result that such tubes tend to crack and fail, and have a relatively short useful life.

SUMMARY OF THE INVENTION

One of the objects of the invention is to provide an improved heater of a type which is effectively prevented from overheating even if the hobbyist should remove it from the tank while it is connected to a power source.

The invention is directed to an improved immersion heater for aquariums which are sold to accommodate fish and sea life, and which functions to maintain the water in the aquarium at a constant preselected temperature. The device includes a housing having an axially extending tube forming a chamber in which a heating cartridge is disposed and extends axially. The tube is filled with a heat conducting liquid over a substantial axial length of the cartridge and the liquid functions, not only to transmit heat to the walls of the tube and thus to the aquarium water, but also functions as a heat control which will activate and deactivate the heater, either in conjunction with another control or solely.

Another object is to provide a heater which, as a result, is far safer for hobbyists to use, while still as effective, or even more effective, for accomplishing the purposes for which it was designed.

Still another object is to provide a heater which can operate at lower temperature than contemporary heaters, and can be built of less expensive plastic materials, and so is extremely economical to manufacture and assemble in mass production operations.

A still further object is to provide a heater of the type described which operates efficiently and can be preset to provide and maintain the desired tank temperature with considerable accuracy.

Other objects and advantages of the improved heater form will be pointed out specifically, or will become apparent from the following description when it is considered in conjunction with the appended claims and the accompanying drawings, in which:

FIG. 1 side elevational view showing a heater constructed according to the invention mounted in position in immersed condition within an aquarium, the heater control elements being shown in a separated position in which the heater is energized and the resistance wire coils being omitted in the interest of clarity; the chain lines indicating an extended contact breaking position of the control plunger;

Referring now more particularly to the accompanying drawings, and in the first instance to FIGS. 1–3A thereof, a letter A generally refers to an aquarium tank constructed of side and end walls 10 and 11 respectively in the usual manner. The tank may be constructed and sealed in the manner disclosed in the present assignee's U.S. Pat. No. 3,759,224 which is incorporated herein by reference.

The aquarium A includes a bottom wall (not shown) of the character disclosed in the aforementioned patent and it should be noted that the aquarium tank is filled with water 12 which may be salt water or fresh water, dependent on the type of fish life to inhabit the aquarium tank. A perimetral top frame member, generally designated 13, of the type disclosed in the aforementioned patent secures the side and end walls at the upper end of the aquarium tank.

Figures 1, 2:
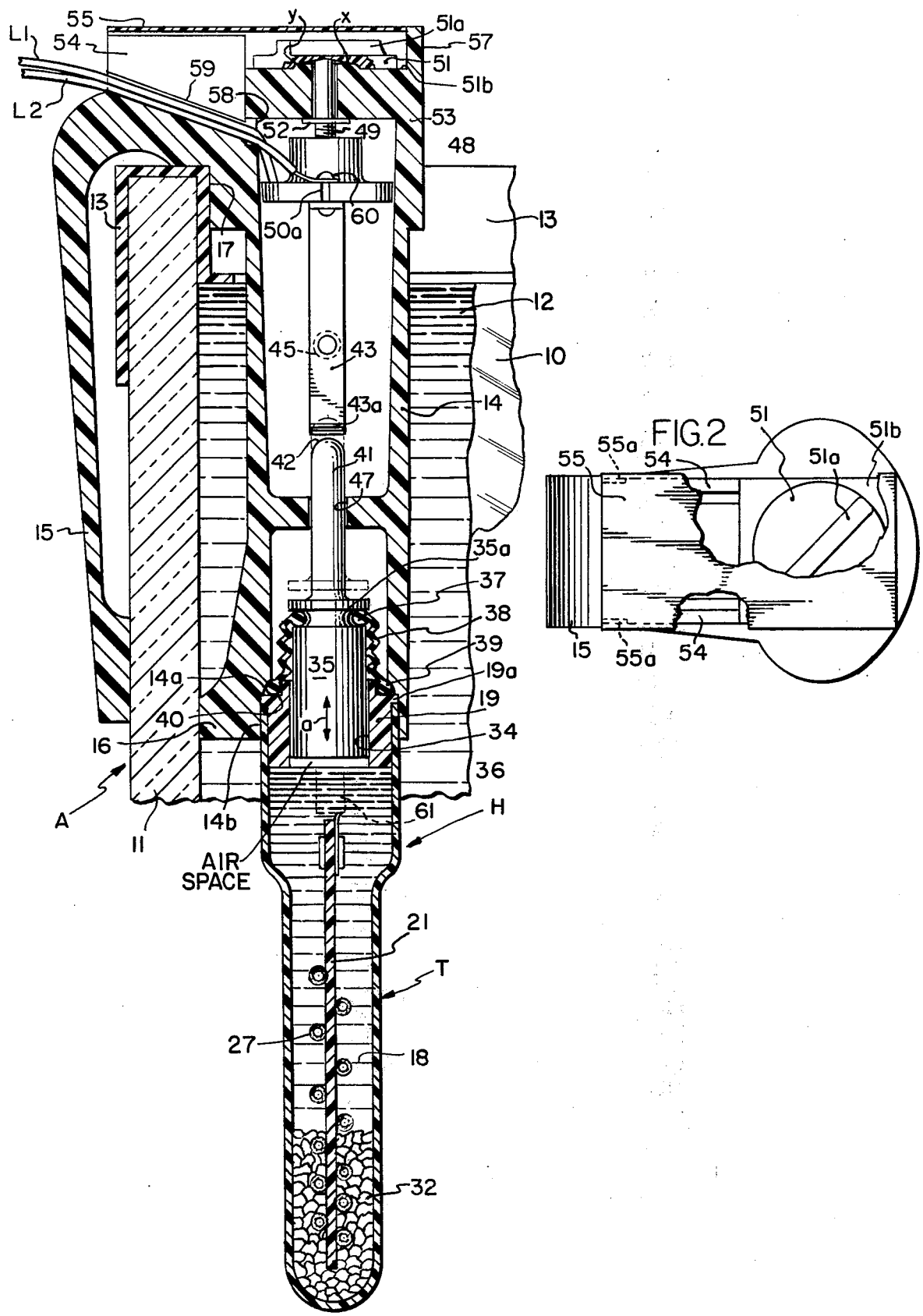
FIG. 2 is a top plan view of the heater only, with a portion of a removable cap cover being broken away to illustrate the temperature adjusting knob which it houses.

The heater, which we have generally designated H, includes a non-electrically conductive upper body 14 which may be molded of a suitable plastic material having good heat stability. In the present instance it will be noted that the housing 14 is formed with a tank over-hanging clip 15 for securing the heater in position on a side wall 11. Provided on the one side of housing 14 to hold the housing 14 away from the aquarium side wall 11 is an internal projection 16, and it is to be understood that the space normally provided between the lower end of clip 15 and projection 16 is less than the thickness of aquarium glass wall 11 so that, much like a pencil clip, the housing 14 grips the wall 11 and retains the heater H in stable position thereon. A shoulder 17 provided on housing 14 is configured to receive the upper end of the top frame member 13 as shown in FIG. 1 and thus (with clip 15 and projection 16) furnish three point positioning engagement.

The heater H also includes a similarly non-electrically conductive lower tube part T, forming a chamber c, which preferably is formed of a transluscent, white, polyester plastic such as that sold by the General Electric Company of U.S.A. under the trademark VALOX. The tube T is a relatively thin walled envelope which has good heat stability at temperatures below 500° F. and may be 0.050 to 0.070 inches in thickness.

A non-electrically conductive, heat expansible, heat conducting liquid 18, such as a silicone oil (Versalub 1091 sold by General Electric Company may be used) is provided within the chamber c provided by tube T. Other mediums may be used, of course, provided they meet these requirements and similarly have a boiling point above about 400° F., do not degrade below that temperature, are electrically non-conductive, expand and contract linearly with temperature variations in the temperature range of operation, and are chemically inert in the sense that they do not deteriorate the other heater components. The open upper end of tube T is closed by a non-electrically conductive plastic plug or block 19 configured to the oval shape of the upper end of tube T so as to seal it, the plug 19 having a flange 19a which is supported on the open upper end of tube T as shown. Preferably, the flange 19a is adhesively or otherwise secured to the tube T during assembly of the product and is thereby axially fixed in position.

Figure 3:
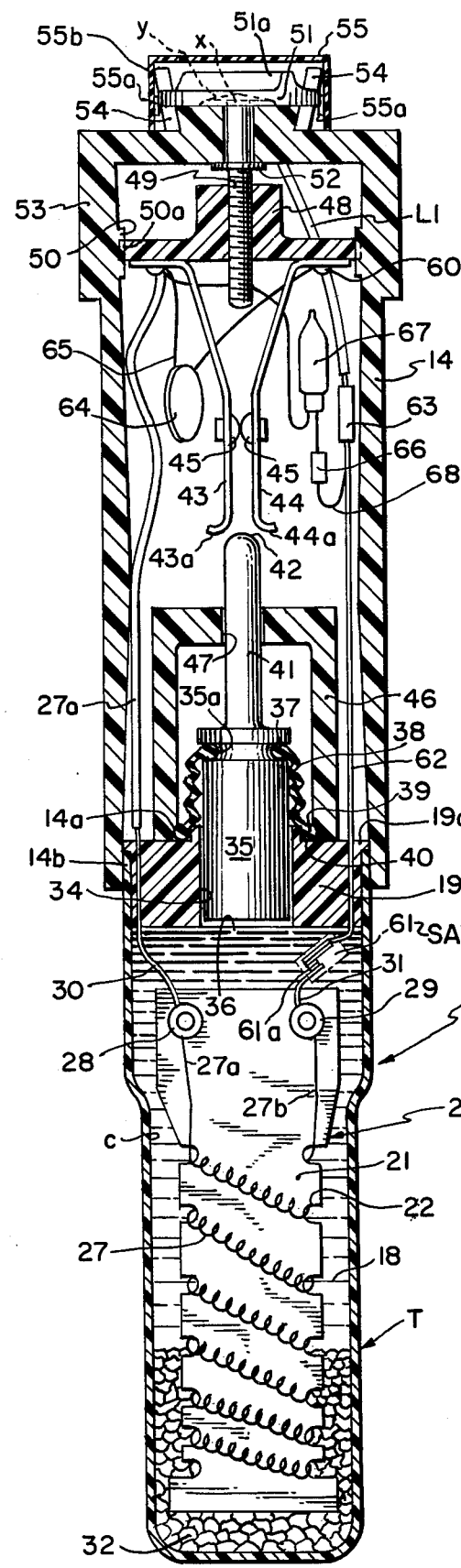
FIG. 3 is a sectional end elevational view of the heater.

Submersed in the heating medium or liquid 18 in tube T, is a heater element, generally designated 20, which, as shown in FIG. 3 particularly, may include a mica core or card 21 having axially spaced grooves 22 around which a continuous resistance heating coil 27 is wound. The grooves 22 are more closely spaced at the lower end of the card 21. The opposite ends 27a and 27b of coil 27 connect to terminals 28 and 29 provided on the non-electrically conductive core 21, and conductor wires 30 and 31 extend upwardly from the terminals 28 and 29.

We have discovered that, at the temperature at which we desire the heater to operate, convection currents which are created in the liquid 18 tend to concentrate the heat in the upper end of tube T. To counter the convection current effect, a bed of heat-retaining particles such as quartz particles, of about one eighth inch × one eighth inch in size, are provided in about the lower third of tube T as shown in FIGS. 1 and 3. These particles prevent the heat zoning which otherwise occurs and permit the whole axial length of the liquid column 18 to operate at a normal operating temperature of about 230° F. in a state of relative thermo-equilibrium. The bed of loose particles 32 also, of course, helps to support the core element 21 in axial position.

As indicated, during operation of the heater, heated liquid tends to move upwardly along the mica core 21 toward the upper part of tube T. The convection current action is accelerated with a greater temperature differential between the bottom of the liquid in the tube chamber T and the upper portion thereof so the effect is self-feeding. For this reason we provide a greater concentration of the resistance wire coils 27 near the bottom of the core 21 in addition to bed 32. The bed 32, of course, consists of a pile of loose particles, with the interstices between the particles occupied by the oil 18 and the particles themselves of course coated by the oil 18. By creating what amounts to a heat sink and, because there are more coils in wire 27 near the lower end of tube T, the tendency for the heat to migrate by way of convection currents to the upper part of tube T is greatly minimized and temperature differentials are minimized.

Chemically inert, non-electrically conductive, glass fiber material of the type used in commercial insulation may be substituted for the quartz particles to form a similar bed 32 which is of a more porous character.

Figure 4:
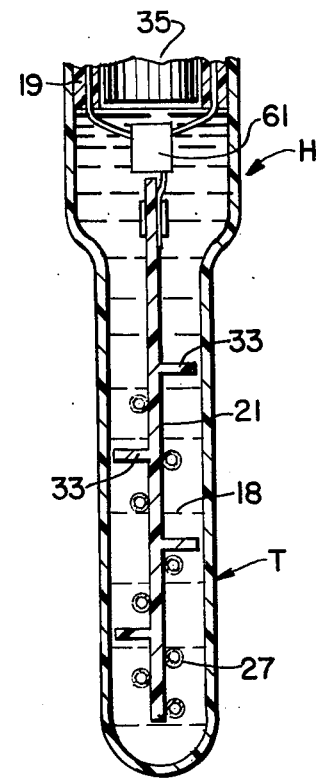
FIG. 4 is a fragmentary, sectional side elevational view, similar to FIG. 1, illustrating a modified form of the invention.
Figure 3A:
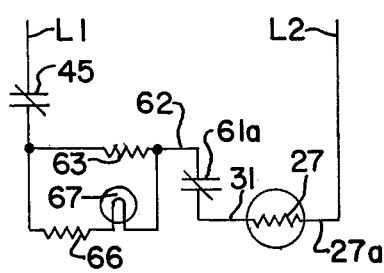
FIG. 3A is a schematic electrical diagram of the heater circuitry.

Still alternatively or supplementally, lateral baffles 33 staggered over the length of the tube as shown in FIG. 4, may be used to break up the flow of convection currents along the core 21 and prevent extreme temperature differentials between the upper part of tube T and the lower end thereof. The alternately staggered baffles 33 substantially laterally bridge the tube T except for perimetral passages between the baffles and tube wall T.

The block 19, which partially closes the open uppr end of the tube T, is provided with a centrally disposed axial opening 34 for receiving a plunger or piston 35 which is capable of movement in an axial direction in the direction of arrows a with expansion and contraction of the liquid 18. It will be noted that the liquid 18 does not completely fill the space below block 19 and that a very limited air space 36 remains. The function of this limited air space, which is of exaggerated volume in FIGS. 1 and 3 for purposes of clarity of illustration, will be later described in detail.

The cylindrical plunger 35 includes an annular groove 35a which receives the upper beaded end 37 of a resilient rubber bellows diaphragm 38, the lower end of tubular elastic diaphragm 38 having a similar beaded end 39 received by a shouldered portion 40 of block 19. The function of diaphragm 38 is to seal the plunger 35 and offer as little resistance to plunger movement as possible. The lower end of housing 14 includes an internally grooved surface 14a which fits over the beaded end 39 and holds the lower end of diaphragm 38 securely in position, housing 14 being preferably adhesively secured to the tube T around its lower surface 14b.

The upper end of cylindrical plunger 35 is reduced in diameter to form an axially extending stem 41 having a hemispherical end 42 which is in axial alignment with a pair of depending preloaded spring contact leaves or bars 43 and 44 (see FIG. 3). The resilient thermostat contact bars 43 and 44 which mount hemispherical contacts 45, are configured so as to normally preload contacts 45 (i.e. 3–6 ounces) in a state of preload engagement, as shown in FIG. 3. However, when the stem 41 is axially extended to engage and spread the outwardly curved ends 43a and 44a of the contact bars 43 and 44 respectively, as indicated by the chain lines 41 in FIG. 1, bars 43 and 44 are spread sufficiently to separate the contacts 45 and break the circuit.

A cage part 46, forming a part of housing 14, includes an axial guide opening 47 for the stem 41 to aid in laterally stabilizing its axial movement. The cage 46 also prevents its extreme axial movement. Diaphragm 38 may be formed of nitrile rubber in substantially the 40–55 durometer rating.

As indicated in FIG. 3, the contact bars 43 and 44 are secured at their upper ends to a nut member 48 which is prevented from rotating but has axial movement along an adjusting screw 49 which supports it in position. A key member 50 may be provided on the interior wall of housing 14 to engage in a groove 50a provided in the peripheral surface of nut 18 and prevent it from rotating while permitting its free axial movement along screw 49. Screw 49 is prevented from moving axially by an adjusting knob 51 provided on its upper end and by a snap ring collar 52 provided intermediate its ends as shown, on opposite sides of a housing upper section 53 which preferably is molded integrally with the clip 15. A pair of vertically inclined tracks 54 (FIGS. 2 and 3), also molded integrally with the upper wall section 53, function as slide guides for a channel-shaped cap 55, having sides 55b which frictionally engage and slide along guides 54. Provided at the rear end of the cap 55 are cam lugs 55a which, when the cap is almost fully closed, further spread the vertical walls 55b, causing these side walls 55b of the cap to be laterally spread from their normal positions and thus causing cap 55 to resiliently grip walls 54. At the front end of the device, a front wall 57 of upper section 53 functions as a stop for the removable cap 55, which, when closed, prevents access to the adjusting knob 51.

An opening 58 in housing wall 14 and an opening 59 in the section 53 permit egress of the wires L1 and L2 which connect with a plug (not shown) which may be received in a socket connected with any suitable source of household current. The wires L1 and L2 connect to the terminals 60 which also anchor the contact bars 43 and 44. The knob 51 includes a pointer member 51a which, in the usual manner, is adjusted relative to indicia provided on stationary temperature scaled surface 51b. Also, a boss x on surface 51b is provided to be closely received by the under recess y in knob 51 so that no O-ring seal is required at this point.

THE ELECTRICAL CIRCUIT

Provided in the circuitry connected with wire 31, and immersed in the liquid 18, is a bi-metallic safety thermostat 61 which comprises a conventional bi-metallic switch, with normally closed contacts 61a disposed within a non-electrically conductive, heat-conductive sealed casing. Such switches are commercially available and will open when the temperature of fluid 18 reaches a predesignated value. A circuit line 62 leads from switch 61 through block 19 and connects to one of the terminals 60, there being also a resistor 63 provided in the circuit line. Power is supplied to the device via the power source lines L1 and L2, which as noted are plugged into any suitable source of current, such as 110 volt, alternating current. A capacitor 64 is connected in a parallel circuit line 65 as an anti-sparking device and a resistor 66 and indicator lamp 67 are provided in the line 68 which also parallels lines L1 and L2 (see the circuit diagram FIG. 3A).

THE OPERATION

In practice and, as shown in FIGS. 1 through 3A, the heater coil 27 is energized and the heater is operating when the contacts 61a and contacts 45 are made. At this time the indicator lamp 67 is also energized so that the hobbyist is aware that the heater coil 27 is transmitting heat to the liquid medium 18 and, through heater tube T, to the aquarium medium 12.

The axially adjustable screw 49 is set in the first place so that the contact bars 43 – 44 are in a position to maintain the water temperature of the aquarium at typically 78° F., or within temperature range of 75°-80° F. At this setting, and with thermostat switches 61 and 45 in a closed condition, indicating heat is required by the aquarium medium 12, heat will be supplied to the heater element 20 to maintain the temperature of the fluid 18 in tube T at a predesignated heat transmitting temperature considered safe for operation of the unit, i.e. 150° F. If the temperature of the temperature sensing medium 18 should rise above this temperature, the heat expansive liquid 18 would expand sufficiently to force plunger 35 upwardly, thus expanding the bellows 38 and forcing the stem 41 to separate contact bars 43 and 44 to the point that contacts 45 were broken, thereby breaking the circuit to heater coil 27. Because there is a radius 42 on the upper end of stem 41, instead of a sharp tip, the sensitivity of the device is reduced sufficiently so that the contacts 45 are not continually being made and broken and do not rapidly burn out. Moreover, because the action of the expanding fluid 18 is also to compress the air in space 36, the tendency of the device to cycle rapidly is also considerably reduced and there are less cycles per minute. The volume of air in space 36 is less than 10 percent by volume of the amount of fluid 18 in the tube T, and in the commercial embodiment of the heater about one sixteenth of an inch of axial thickness is provided below the block 19 as an air space. This forms an air bubble which functions somewhat as an air spring and reduces the cycles from something like 16 cycles per minute to 2 per minute while still maintaining the accuracy which is desired. By correlating the volume of air space 36 with the preload forcing contacts 45 together, a sharp "break" and "remake" of contacts 45 occurs. Even though the expansion of fluid 18 is gradual and the air in space 36 is compressed gradually, contacts 45 will be sharply broken once a threshold compressive pressure is achieved and similarly will be sharply remade when that pressure threshold no longer exists. The forces of gravity return the plunger 35 when the liquid 18 contracts and the resiliency of bellows 38 aids.

The thermostat 61, which is set to break its contacts 61a at a predesignated higher temperature (i.e. 300° F.), acts as a safety device so, if for any reason the contacts 45 should freeze, the heater 20 still will be deenergized. Since the thermostat 61 is immersed in the liquid 18 in temperature sensing relationship with it, the heater unit is virtually foolproof and extremely safe to use.

If the entire heating assembly is removed from the aquarium while still plugged into the current source, to permit the hobbyist to inspect the unit, or while cleaning the tank, the contacts 45 would nevertheless be broken with expansion of the fluid 18. The expansion of fluid 18 is uniform or linear when the temperature of the liquid 18 is within a temperature range of 70° to 300° F. and we have found that the temperature of the aquarium water 12 can be maintained to within one to two degrees centigrade, assuming a reasonable stability of the ambient temperature of the room in which the aquarium is disposed. With the cap 55 in position, children cannot inadvertently twist the temperature setting control knob 51 and the device is virtually tamperproof. It should be apparent the device is extremely easy to assemble and yet achieves proper sealing, for instance, by beaded ends 37 and 39 and surfaces x and y.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. In a safety heating device for upright immersion in liquid filled aquariums: a housing including an axially extending heat transmitting tube with imperforate side walls and in imperforate end wall forming a chamber sealed except at its upper end and having linearly heat expansible, heat conducting liquid therein; an electrical circuit; an electrically operated heater connected in said circuit and extending axially in said tube and being substantially immersed in said liquid; an actuator assembly closing the top of said tube and having an axially and linearly movable plunger operatively associated with said liquid to be reactive to thermal expansion of the liquid while the liquid is in a liquid state for axial movement relative to said tube; a switch connected in said circuit with said heater comprising first and second electrical contacts; means supporting said plunger so as to be spaced from the surface of the liquid by an air space having a volume less than about ten percent of the liquid volume and said plunger being responsive to the thermal expansion of the liquid via said air space as a damping medium to activate and deactivate the switch contacts with expansion and contraction of said liquid to control the temperature of said liquid via energization and deenergization of said heater and maintain a constant liquid temperature.

2. The device of claim 1 wherein an expansible and contractible resilient bellows diaphragm is connected in sealing relation between said housing and plunger to support the plunger and, if necessary, aid in returning it to initial position when the liquid contracts.

3. The device of claim 2 wherein said plunger includes an axially extending stem of reduced diameter having a curvilinear end surface; and said switch also incorporates spreadable contact bars for carrying said contacts, axially disposed to be contacted and spread by said stem.

4. The device of claim 3 wherein said plunger has a groove for receiving a beaded end of said diaphragm and the opposite end of the diaphragm also has a bead, the said opposite end being retained by a frame part fixed to said housing.

5. The device of claim 4 wherein said frame part comprises a diaphragm surrounding guide for the stem having an end wall with an axial guide opening through which said stem extends.

6. The device of claim 1 as set forth wherein the position of at least one of said contacts is adjusted by a linearly adjustable member carried by said housing; and indicia for adjusting the latter member, which relate to the linear expansion of the liquid in which the heater is immersed, are provided.

7. The device as set forth in claim 1 wherein the actuator assembly includes a fixed plug having an opening and said plunger is received for axial movement in said opening, said plunger extending axially upwardly beyond said plug in all operating positions thereof; and an axially extending tubular bellows diaphragm surrounding said plunger and sealably mounted to said plunger at its upper end, and fixed to said plug to seal off said tube at its lower end, said diaphragm functioning to support the plunger and, if necessary, assist in returning it to initial position when the liquid contracts.

8. The device as set forth in claim 7 wherein said housing includes a diaphragm surrounding guide having an end wall with an axial guide opening through which said plunger extends.

9. The device as set forth in claim 1 wherein said first and second contacts comprise spreadable contact bars axially disposed to be spread by said plunger.

10. The device as set forth in claim 9 wherein said bars are mounted on a linearly adjustable member which cooperates with indicia for gauging the extent of its adjustment.

11. The device as set forth in claim 9 wherein said plunger includes an axially extending upper stem of reduced diameter having a curvilinear end surface for engaging and spreading said bars.

12. The device as set forth in claim 9 wherein said bars comprise leaf spring resilient members with outwardly flared ends preloaded to normally dispose the contacts in engagement.

13. The device as set forth in claim 1 wherein a high temperature safety bi-metallic thermostat in operative contact with said liquid is additionally serially connected in said circuit to energize and deenergize said heater.

14. The device as set forth in claim 13 wherein said thermostat is immersed in said liquid and set to operate when the liquid is at a considerably higher temmperature than that which will break said contacts.

15. The device as set forth in claim 1 wherein a mechanism is provided in the portion of the tube occupied by the heater to help overcome the convection current effect in the liquid.

16. The device as set forth in claim 15 wherein the mechanism comprises a particulate bed of heat retentive material provided only in the lower end of tube.

17. The device as set forth in claim 15 wherein said heater comprises an electrically non-conductive heating element core having resistance heater coils disposed thereon, and said mechanism includes a greater concentration of coils at the lower end of said core.

18. The device as set forth in claim 15 wherein said mechanism includes alternatively staggered, axially spaced, laterally extending baffles which laterally bridge the tube except for perimetral passages between the baffles and tube.

19. The device as set forth in claim 1 wherein at least one of said contacts is mounted on an axially adjustable member operated by an adjusting screw, with a knob thereon disposed outside the upper end of the housing; and a removable cover is provided on said housing over said knob.

20. In a safety heating device for upright immersion in liquid filled aquariums: a housing including an axially extending heat transmitting tube with imperforate side walls and an imperforate end wall forming a chamber sealed except at its upper end and having linearly heat expansible, heat conducting liquid therein; an electrical circuit; an electrically operated heater connected in said circuit and extending axially in said tube and immersed in said liquid, an actuator assembly closing the top of said tube and including means operatively associated with said liquid to be reactive to thermal expansion of the liquid while the liquid is in a liquid state, said reactive means including a plunger movable axially linearly, responsive to temperature change in the liquid, to various positions dependent on the temperature of said liquid; a diaphragm surrounding the plunger and connected at one end to the plunger and at the other end to the housing to support the plunger; a normally closed switch, connected in said circuit with said heater, comprising normally electrically connected first and second electrical contacts positioned to be electrically disconnected with axial upward movement of said plunger to deactivate the switch with expansion of said liquid and control the temperature of said liquid via deenergization and energization, of said heater.

21. The device of claim 20 wherein a bi-metallic safety thermostat device, serially connected in said circuit, is at least partly immersed in said fluid.

22. The device as set forth in claim 20 wherein said diaphragm normally holds the plunger at a spaced distance above the lower end of the plug to provide an air space of predetermined volume between the lower end of the plunger and the normal upper level of liquid when the liquid is at operating temperature.

23. The device as set forth in claim 20 wherein said diaphragm is an expansible and contractible resilient bellows member functioning to seal the tube and position the plunger.

* * * * *